(12) United States Patent
Kurtz et al.

(10) Patent No.: US 7,841,240 B2
(45) Date of Patent: Nov. 30, 2010

(54) HEADER FOR A DIFFERENTIAL PRESSURE TRANSDUCER

(75) Inventors: Anthony D. Kurtz, Saddle River, NJ (US); Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 290 days.

(21) Appl. No.: 12/148,060

(22) Filed: Apr. 16, 2008

(65) Prior Publication Data

US 2009/0260446 A1    Oct. 22, 2009

(51) Int. Cl.
*G01L 9/06* (2006.01)
(52) U.S. Cl. .............. 73/721; 73/715; 73/716
(58) Field of Classification Search .......... None
See application file for complete search history.

(56) References Cited

U.S. PATENT DOCUMENTS

| | | | |
|---|---|---|---|
| 3,850,039 A * | 11/1974 | Brakebill | 73/708 |
| 4,158,311 A * | 6/1979 | Yasuhara et al. | 73/718 |
| 4,369,728 A * | 1/1983 | Nelson | 116/276 |
| 4,406,993 A | 9/1983 | Kurtz | |
| 4,567,395 A * | 1/1986 | Pundarika | 310/338 |
| 4,570,097 A * | 2/1986 | Shukla et al. | 310/338 |
| 4,748,861 A * | 6/1988 | Matsumoto et al. | 73/866.3 |
| 6,105,437 A * | 8/2000 | Klug et al. | 73/756 |
| 6,112,597 A * | 9/2000 | Tschope | 73/756 |
| 6,119,524 A * | 9/2000 | Kobold | 73/727 |
| 6,595,066 B1 | 7/2003 | Kurtz et al. | |
| 6,993,973 B2 * | 2/2006 | Lischer et al. | 73/724 |
| 7,137,301 B2 * | 11/2006 | Grudzien | 73/718 |
| 7,141,447 B2 * | 11/2006 | Grudzien | 438/51 |
| 7,150,639 B2 * | 12/2006 | Fehrenbach et al. | 439/151 |
| 7,204,150 B2 * | 4/2007 | Grudzien | 73/718 |
| 7,284,439 B2 * | 10/2007 | Jonsson | 73/724 |
| 7,316,163 B2 * | 1/2008 | Grudzien | 73/718 |
| 7,624,643 B2 * | 12/2009 | Grudzien | 73/718 |

* cited by examiner

*Primary Examiner*—Lisa M Caputo
*Assistant Examiner*—Jermaine Jenkins
(74) *Attorney, Agent, or Firm*—James E. Schutz, Esq.; Dean Y. Shahriari; Troutman Sanders LLP

(57) ABSTRACT

There is disclosed a header for a differential pressure transducer. The header has a cylindrical sensor housing section which has a front and a back surface. The front surface has a sensor accommodating recess. There is a plurality of terminal pins extending from the front surface and directed through the housing to extend from said back surface. The pins are arranged in a semi-circular pattern, said sensor housing having a stem aperture and cylindrical wall. A stem housing is positioned in the stem aperture and is brazed thereto. The stem housing has a stem passageway directed through the housing which communicates with a passageway in the cylindrical sensor housing. The cylindrical sensor recess contains a sensing device which receives a first input pressure on one diaphragm surface of the sensing device and a second input pressure on a second surface of the diaphragm to produce a differential output pressure. The header, as indicated, is rugged and simple to use and produce.

9 Claims, 2 Drawing Sheets

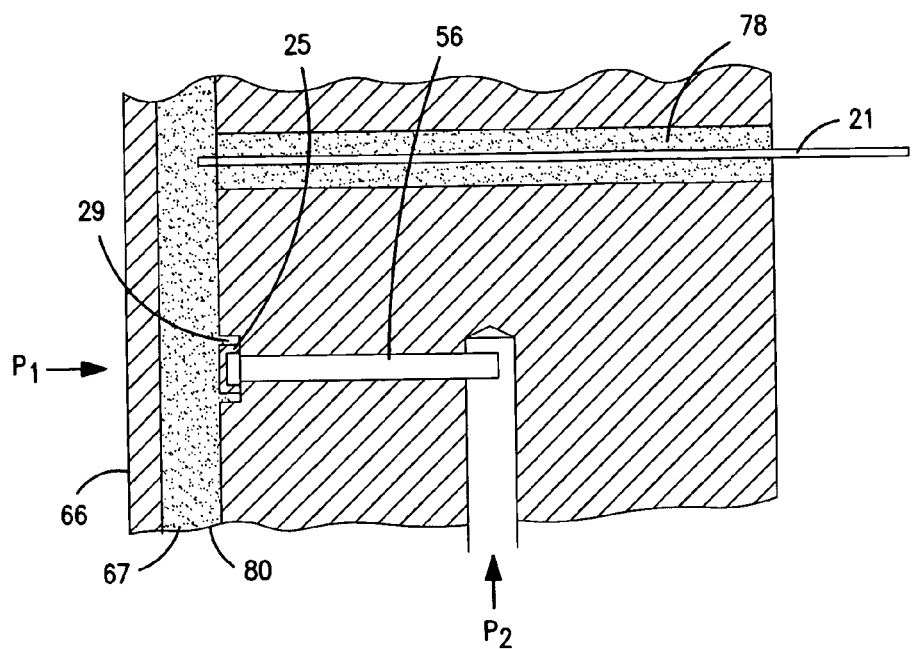
FIG. 5
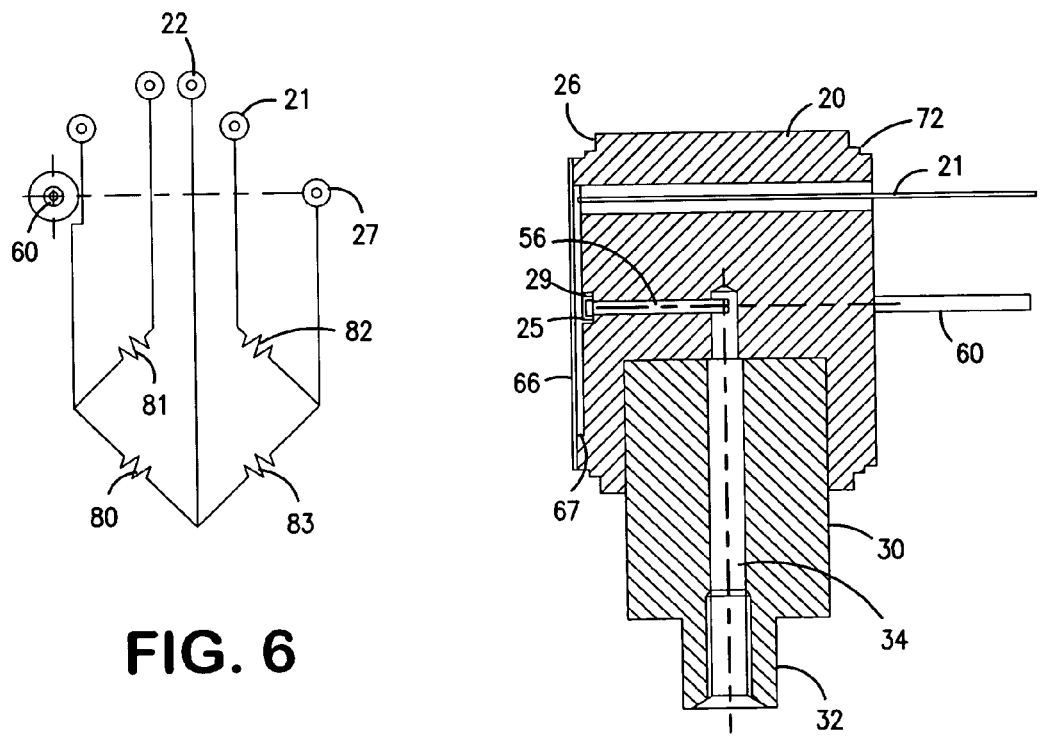
FIG. 6
FIG. 7

HEADER FOR A DIFFERENTIAL PRESSURE TRANSDUCER

RELATED APPLICATIONS

This application is related to Kulite 144 entitled Low Differential Pressure Transducer filed on Feb. 14, 2008 and having Ser. No. 12/070,255.

FIELD OF THE INVENTION

This invention relates to pressure transducers and more particularly to a differential pressure transducer and header.

BACKGROUND OF THE INVENTION

A differential pressure transducer is a device which provides an output which is the difference between two input pressures. For example, when a Pressure $P_1$ is applied to one face of a deflecting diaphragm and a pressure $P_2$ is applied to the other face of the deflecting diaphragm the resulting deflection will be determined by the difference in pressure (as for example $P_1$-$P_2$). There are other differential pressure transducers which essentially use two separate semiconductor structures each structure having its own diaphragm and the piezoresistor devices which are employed on the diaphragm surface are connected together to form a bridge which will provide a differential output. Reference is made to U.S. Pat. No. 6,595,066 entitled Stopped Leadless Differential Sensor issued on Jul. 22, 2003 to A D Kurtz, et. al. and assigned to the assignee herein. That patent shows a differential transducer where the pressure is applied to the top face or the top side of the diaphragm and to the bottom face or bottom side of the diaphragm to obtain a differential output. The patent shows a Wheatstone Bridge array consisting of piezoresistors which vary resistance according to the magnitude of a pressure or force applied to the diaphragm.

As one can ascertain from the prior art, pressure transducers including differential pressure transducers are associated with a header. Such headers provide a housing for the transducer structure, which housing enables the pressure transducer to be placed in various positions so that pressure measurements can be made. In any event, in regard to pressure transducers which operate with a differential output, a header is desired whereby a front or an input port and a side as another input port can be welded directly to the transducer assembly. The transducer can be oil-filled but there has to be a separation between the ports to enable two separate housings to be coupled to the transducer header assembly to enable quick and efficient installation. This is necessary and one should also have easy access to the terminals for a quick and efficient installation. An important aspect of the present invention is to place the pins in a pattern such as a semi-circle in a first cylindrical sensor housing to provide adequate room so that a cylindrical stem section can be brazed to the cylindrical sensor housing section.

SUMMARY OF THE INVENTION

A header for a differential pressure transducer comprising: A cylindrical sensor housing section having a front and a back surface, said front surface housing a sensor accommodating recess, a plurality of terminal pins extending from said front surface and directed through said housing to extend from said back surface, said pins arranged in a predetermined pattern, such as a semi-circle configuration, said sensor housing having a stem aperture in said cylindrical wall with said aperture extending from said wall in to said housing, said sensor having a passageway communicating at one end with said recess and at other end with said aperture;

A stem housing section positioned in said stem aperture at one end and having a stem passageway directed through said stem housing section with a first opening at said one end and an opening at said other end to create a fluid path from end to end communicating with said sensor passageway.

BRIEF DESCRIPTION OF THE FIGURES

FIG. 5 is an enlarged view showing certain aspects of the header including the sensor device.

FIG. 6 is a schematic view showing how the Wheatstone Bridge is connected to the pins associated with the header.

FIG. 7 is a cross-sectional view as FIG. 2 shown larger in order to fully understand the nature of the invention.

DETAILED DESCRIPTION OF THE FIGURES

Figure 1:
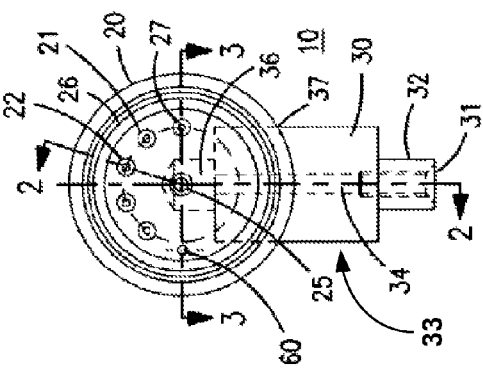
FIG. 1 is a front view of a transducer header according to this invention

Referring to FIG. 1 there is shown a differential header 10 for a pressure transducer. As indicated above, a differential transducer provides an output which is the difference between two input pressures. In any event, the header depicted in FIG. 1 is shown in a front view and is shown without the metal isolation diaphragm positioned thereon. As seen, the header consists of a circular or cylindrical top section 20 which is coupled to a stem or bottom section 30. The bottom section 30 has a first cylindrical area 33 which terminates in a smaller diameter cylindrical area 32. The top section of the cylindrical stem 30 is inserted into an aperture 37 associated with the cylindrical member 20. The two are joined together by means of a brazing technique or some other metal joining technique. However brazing is a preferred method of securing the two parts together. Both parts 20 and 30 are fabricated from a non-corrosive metal such as stainless steel, Iconel or some other material. Essentially, as will be further described, there is a central canal or aperture 34 associated with members 32 and 33 with a port designated by reference number 31. As seen, the section 20 is circular and basically cylindrical and contains contacts designated as 21, 22 and 27, which contacts are arranged in a semi-circle design. The contacts are associated, as will be explained, with contact areas or terminals of sensor 25 which may, for example, be a piezoresistor sensing device containing a Wheatstone Bridge thereon. The leads on the Wheatstone Bridge are brought out to the terminals such as 21, 22 and 27. These terminals are essentially nail head header pins which are surrounded and bonded to the header section 20 by a glass bond. As indicated these header pins are five in number and are arranged as shown in both FIG. 1 and FIG. 4 in a semi-circle figuration. There is also shown an oil-filled tube 60. As will be explained, the sensor 25 is positioned within a depression or recess 29 in the header 20. Oil then fills the space between the surface of the header and the isolation diaphragm 66. The isolation diaphragm, as will be further explained, may be a stainless steel diaphragm and is welded via the peripheral flanges 26 as existing on the member 20. This is clearly seen in FIG. 2.

Figure 2:
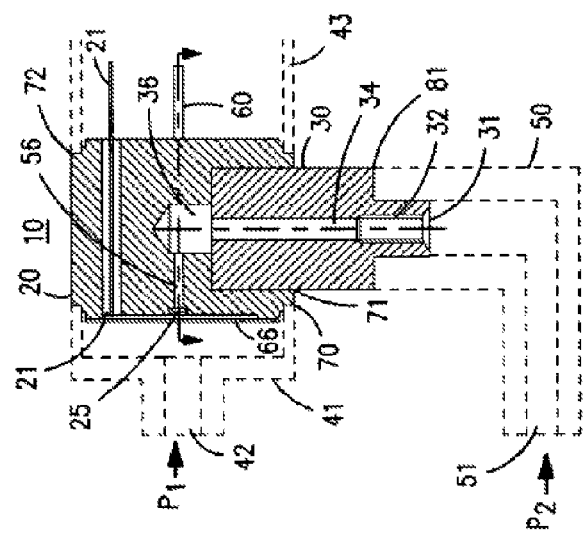
FIG. 2 is a cross-sectional view of the transducer header of FIG. 1 taken through line 2-2.

In FIG. 2 there is shown the isolation diaphragm 66 which is positioned above the sensor 25. There is an oil space between the diaphragm 66 and the sensor, which space is filled with oil, which oil is directed into the device through an oil-fill tube 60. When the cavity is filled with oil the tube 60 is pinched or further cut off so that no oil can escape. As seen in FIG. 2, there is shown the pin 21 which is coupled to one terminal of the sensor configuration 25. The sensor configuration as indicated is normally a Wheatstone Bridge. As seen there is a front port member 41 which is fabricated from a steel or other metallic material and is welded to the section 20 at the area 70 which basically is a circular area surrounding the extending flange on member 20. The housing 41 contains an input port 42 where an input pressure $P_1$ is directed. This pressure $P_1$ is impressed upon the diaphragm 66 which causes the oil to transmit the pressure or force to the sensor arrangement 25. In order to provide differential operation, a second side port housing 50, having a side port opening 51, is welded about the stem 32 and section 30 at area 81. Thus as seen, a second pressure $P_2$ which is applied via port 51 is propagated via aperture 34, aperture 36 and is directed into tubular aperture or channel 56. The channels 34 and 56 are at a right angle with respect to one another. Channel 56 communicates with the bottom surface of the sensor 25 and thus supplies the pressure $P_2$ to the bottom surface. As seen there is no oil in this path and hence such a sensor is designated as a wet/dry pressure transducer assembly. The designation is because of the fact that pressure $P_1$ impinges on a diaphragm where the pressure is transmitted to the sensor via the oil. While pressure $P_2$ can be from a dry environment and impinges on the underside of the diaphragm as will be further explained. In this manner the diaphragm receives two pressures $P_1$ and $P_2$ and the sensor bridge produces an output equal to the difference of the input pressures.

Figure 3:
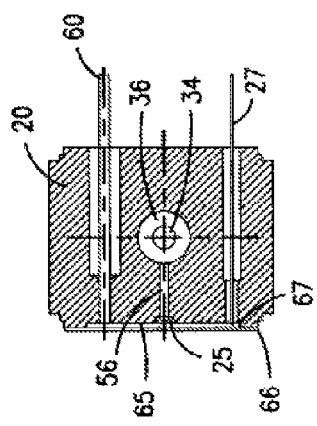
FIG. 3 is a cross-sectional view of the header of FIG. 1 taken through line 3-3 of FIG. 1.

In FIG. 3 there is shown a cross-sectional view taken through line 3-3 of FIG. 1. As one can clearly see, there is shown the oil-fill tube 60, the lead 27, the isolation diaphragm 66 with the sensor 25 positioned and communicating with channel 56, as seen in FIG. 2 channel 56 communicates with channel 34, thus producing a side port 51 and a front port 42. The front and side port assemblies 41 and 50 can be welded directly to the headers 20 and 30 in a convenient and simple manner. As seen in FIG. 2, it is noted that the side port housing 50 can be rotated 360 degrees with respect to the housing 41 or front port 42. And so there are many different mounting positions that can be employed depending on how section 50 is welded to the stem section 30 of the transducer 10.

Figure 4:
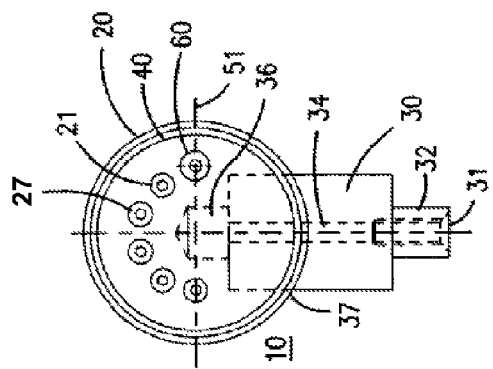
FIG. 4 is a right-side view of the header of FIG. 1.

Referring to FIG. 4 there is shown a right-side view of the transducer depicted in FIGS. 1 and 2. As seen, FIG. 4 is a right-side view while FIG. 1 is a left-side view without the isolation diaphragm shown. FIG. 4 uses the same reference numerals and basically shows the pins as 21 and 27, the oil-filled tube 60 as well as showing the back flanges where one welds the transducer housing section 43 to section 20 via the indented flange. The weld occurs at area 72. The back housing section 43 is shown partially and contains a connector to which pins as 21 are connected.

Referring to FIG. 5 there is shown an exploded view depicting the sensor 25, the depression 29, the isolation diagram 66. As one can see, the area 67 is filled with oil 80, which oil is introduced via the oil-filled tube 60 (not shown). In any event, one can also see how channel 56 communicates with the underside of the sensor diaphragm to cause the sensor 25 to produce an output equal to the difference in pressure as $P_1-P_2$. Basically the sensor comprises a semiconductor diaphragm of an inverted "U" shaped configuration and having located on a surface and within the active area a piezoresistive bridge array.

The array, for example, as shown in FIG. 6 normally includes four resistors 80, 81, 82 and 83, as seen, the bridge terminals are coupled to the pins as 21, 22 and 27 which, as indicated, are arranged in a semi-circle configuration. This pin arrangement provides extra space to allow the stem section 30 to be inserted into the aperture 37 of cylindrical member 20. Thus by placing the pins in this pattern one can insert the stem 30 into body 20 without interfering with the pin positions. A piezoresistive arrays as shown in FIG. 5 and FIG. 6 are very well known and many such structures are known. See, for example, U.S. Pat. No. 4,406,993, entitled "Oil Filled Pressure Transducers" issued on Sep. 27, 1983 to A. D. Kurtz, the inventor herein and assigned to Kulite Semiconductor Products, Inc. As seen located and secured the front surface of the housing 20 via the flange is a metal isolation diaphragm 66. The diaphragm 66 may be fabricated from stainless steel or some other material and it is secured to the metal header 20 by means of a weld or other metal to metal seal. As seen in FIG. 6, the terminals of the pressure sensor are directed via leads as shown to the terminal pins as 21, 22 and 27. The terminal pins in the header have a larger top surface and are inserted in place by means of a glass bond. A glass material surrounds the pins and holds the pins in position. Such materials are well known and many different types of glasses can be used, as various types of solid glass and other high temperature glasses.

The oil-filled tube 60 as shown in FIG. 7 normally has a top flared end that serves as an access port for introducing oil or fluid into the recess 67. Once the oil is inserted into the recess, the tube 60 is crimped or closed to maintain the oil within the recess. Thus as one can see, when a force or pressure $P_1$ is impressed upon the metal diaphragm 66, the oil located in the recess transmits the force to the pressure sensor 25. In a similar manner, when a pressure $P_2$ is introduced into channel 56, this pressure impinges on the bottom side of the diaphragm to cause the sensor to produce a differential output. In any event, FIG. 7 again shows in clearer detail the header containing the top section 20 and the stem section 30, which stem section 30, is brazed into the top section 20.

Referring again to FIGS. 1, 2 and 3, by placing the pins in a semi-circle, a round or cylindrical stem 30 can be easily brazed to the top body 20. A pressure sensor 25 is mounted in a counter bore or recess 29 so that the backside of the diaphragm 66 communicates with the aperture 34 in the stem. The front of the header 30 has the isolation diaphragm 66 welded to it and the space between the isolation diaphragm and the sensor chip is filled with oil through the oil-filled tube. The process creates a wet/dry pressure capsule that allows a front port 42 to be welded directly and a side port 51 to be welded directly. The ports 42 and 51 are associated with housing 41 and 50. There are no interconnecting tubes required to provide a differential pressure transducer as those employed in the prior art. Furthermore, the pressure header is universally adapted to interface with pressure sources coming from many different directions. As one can understand, both housings 41 and 50 can vary in size and direction and be directly welded to the header as containing sections 20 and 30, as shown in FIG. 2. There is a braze as a preferred method of joining the housings sections 20 and 30 together. Essentially, brazing is well known and is accomplished by applying heat and a brazing filler metal to the sections to be joined. Filler metal can be obtained at various temperatures and enable a capillary action to the gap created between the materials to be joined then by creating a metal bond between them at the molecular level. The process is similar to soldering but differs in that the filler metal is of a greater strength and has a higher melting temperature. As indicated, brazing is well known but the ability to braze the stem section 30 to the sensor section 20 enables one to obtain an extremely durable and rugged header of a simple and useful design.

Therefore, those skilled in the art may conceive alternate embodiments and alternate arrangements for such headers, all of which are deemed be encompassed within the spirit and scope of the claims appended hereto and from the detailed descriptions of the Figures.

We claim:

1. A header for a differential pressure transducer, comprising:
   a cylindrical sensor housing section having a front and a back surface, said frontfront surface and directed through said housing to extend from said back surface, said pins arranged in a predetermined pattern, said sensor housing having a stem aperture in said cylindrical wall with said aperture extending from said wall into said housing, said sensor having a passageway communicating at one end with said recess and at other end with said aperture;
   a stem housing section positioned in said stem aperture at one end and having a stem passageway directed through said housing section with a first opening at said one end and an opening at said other end to create a fluid path from end to end communicating with said sensor passageway; and
   a sensor having a diaphragm for deflecting upon application of a force thereon, said sensor having pressure responsive elements located on said diaphragm and operative to change value according to the magnitude of an applied pressure, said sensor positioned in said sensor accommodating recess with one surface of said diaphragm aligned with said front surface of said sensor housing and said other surface of said diaphragm communicating with said sensor passageway, said sensor having a plurality of terminals coupled to said elements.

2. The header according to claim 1 wherein said cylindrical sensor housing section and said stem housing section are metal with said stem housing and said sensor housing being secured together by a brazed bond.

3. The header according to claim 1 further comprising a metal diaphragm secured to said sensor housing and covering said sensor housing recess with the space between said sensor diaphragms and said metal diaphragm filled with a pressure transmitting fluid to cause a pressure applied to said metal diaphragm to be transmitted to said sensor diaphragm at said one surface.

4. The header according to claim 3 wherein said pressure transmitting fluid is oil.

5. The header according to claim 3 further comprising:
   a front pressure port housing welded to said front surface of said sensor housing and having a first opening communicating with said metal diaphragm, said opening designated as a front port, a side pressure port welded to said cylindrical wall of said second housing to surround said stem aperture opening, said second housing having a second opening communicating with said stem passageway, said opening designated as a side port.

6. The header according to claim 5 further comprising means for applying a first pressure ($P_1$) to said front port and a second pressure ($P_2$) to said side port to cause said sensor to provide an output proportional to $P_1-P_2$.

7. The header according to claim 1 wherein said pins are arranged in a semi-circular pattern, with said sensor terminals each connected individually to an associated pin.

8. The header according to claim 1 wherein said sensor is a semiconductor sensor having a "U" shaped cross-section with said "U" shaped positioned in said depression inverted so that the bottom of said "U" faces said front surface with the arms of said "U" briding said sensor passageway.

9. The header according to claim 8 wherein said elements are piezoresistors arranged in a Wheatstone bridge configuration.

* * * * *